United States Patent [19]
Jamieson et al.

[11] Patent Number: 5,418,579
[45] Date of Patent: May 23, 1995

[54] MULTIPLANAR IMAGE DISPLAY SYSTEM WITH PLURAL DISPLAY UNITS

[76] Inventors: Kenneth A. Jamieson; John S. Jamieson, both of 31830 Jefferson, St. Clair Shores, Mich. 48082

[21] Appl. No.: 157,613

[22] Filed: Nov. 24, 1993

[51] Int. Cl.6 .................. H04N 5/74; H04N 13/02; G03B 21/22
[52] U.S. Cl. .................... 348/782; 348/778; 348/42; 348/834; 352/89; 353/78; 353/74
[58] Field of Search ............... 353/28, 74, 78; 352/88, 352/89; 348/47, 48, 781, 782, 785, 834, 42, 44, 52, 778, 780; H04N 5/74, 13/02

[56] References Cited
U.S. PATENT DOCUMENTS

| | | | |
|---|---|---|---|
| 3,707,115 | 12/1972 | Rush | 95/12 |
| 4,306,768 | 12/1981 | Egging | 350/174 |
| 4,738,522 | 4/1988 | Lunde et al. | 353/28 |
| 5,276,524 | 1/1994 | Inoue et al. | 348/778 |

Primary Examiner—James J. Groody
Assistant Examiner—Cheryl Cohen
Attorney, Agent, or Firm—Brooks & Kushman

[57] ABSTRACT

A multiplanar image display system having a plurality of display units disposed to expose, by transmission through and reflection by transparent panels, displayed images to a viewing end of an image chamber. The images overlap along a common viewing axis to create an illusion of a three-dimensional display. The transparent panels and a primary display unit are disposed along, and secondary display units are displaced from, the viewing axis. The transparent panels and the display units are angled to each other and to the viewing axis. The display units are adjustably mounted; and the distances separating the overlapping images, and thereby the amount of parallax, are controllable as a function of the distances between the display units and their associated reflecting transparent panels.

23 Claims, 2 Drawing Sheets

MULTIPLANAR IMAGE DISPLAY SYSTEM WITH PLURAL DISPLAY UNITS

TECHNICAL FIELD

This invention relates to apparatus and methods for providing a display of images in a number of overlapping planes to produce a three-dimensional effect.

BACKGROUND INFORMATION

Several devices have been used to provide images having different depths of field. U.S. Pat. No. 4,306,768, issued to Egging, teaches the creation of multiplanar images. Egging's device includes a primary image generation chamber that is observable along a viewing axis extending through a viewing port. The primary image generation chamber is divided into a plurality of cells each containing an image source such as a portion of a video display tube screen or an actual physical object. The viewing axis extending through the viewing port is substantially at right angles to the video display tube screen; and the image from each portion of the screen is reflected along the viewing axis by a light transmissive, two-way mirror disposed in the primary image generation chamber at an acute angle to the axis. An image from each of the video display tube screen portions is reflected by one of the mirrors and can be observed through other mirrors between the reflecting mirror and the viewing port. Any actual physical object disposed along the viewing axis can be observed through mirrors disposed between the object and the viewing port.

The cells and mirrors can be arranged to provide images having desired depths of field and can be selectively movable to impart an illusion of movement to an image generated at a fixed source. Additional mirrors disposed at a slightly different angle may be used to create additional images.

Egging also discloses a secondary image creation chamber containing fixed or movable shelves. The shelves are also disposed substantially at right angles to the viewing axis extending through the viewing port. Images created at the shelves are reflected along the viewing axis by another light transmissive, two-way mirror disposed in the primary image generation chamber at an acute angle to the axis, images created by the video display tube being observable through this mirror at the viewing port. The shelves are of increasing widths in proportion to their relative distances from their associated mirror so that images created at display portions of more distant shelves are observable past less distant shelves.

The Egging device, while appearing to represent an efficient multiplanar display system for applications requiring images of moderate size, is limited with respect to the total image size it can display. The primary limitation of image size is dictated by the maximum practical size of its video display tube. Even a large tube would provide relatively small images because its screen is divided into separate cells. The number of images would also be similarly limited.

Even if the tube were to be replaced by a separate video display tube for each of its cells, the disclosed construction of the device would require that the housing be impractically deep, which would make it unsuitable, for example, for large wall displays. Such a display would be costly to build, would be unwieldy to transport and would infringe on premium available display room space.

The Egging device requires a certain minimum difference in the depths of field between successive images. Again, an enlarged version of the device for use as a wall display would not be practical due to the amount of parallax created by the relatively large distances between successive images. The parallax effect would be particularly noticeable and undesirable with a large display because observers would likely be moving past the viewing port rather than remaining directly in front of it.

The Egging device also uses elements that have a reflective surface, for example, a "partially silvered coating" (column 3, line 20) on one side to reflect images to the viewing port. Such elements reduce the amount of light passing therethrough, thus limiting the number of reflecting elements and their associated images that can be displayed effectively.

U.S. Pat. No. 4,738,522, to Lunde et al., teaches a method and apparatus for coordinated super imposition of images in a visual display. It discloses a method for combining projected images with a three-dimensional, model set. A second set matching the model except for scale is used for live actors and other images. Props used on the second set are blacked out and invisible when photographed.

The actors are taped acting on the second set, and, using a beam splitter, a recorded image is superimposed on the image of the model set to create an illusion that the actors are interacting with the props. Live images of the actors can also be used without being recorded.

U.S. Pat. No. 3,707,115, to Rush, teaches a method for producing a three-dimensional diorama. It discloses a three-dimensional reflective screen upon which is projected a series of images from photographic transparencies. Each image illustrates the same basic exhibit in full color but differing in details. The three-dimensional screen is used as a base for a number of full color, three-dimensional models of differing detail. Each model is photographed from an indexed position. The screen is then stripped of all removable details, and the photographs are projected onto its three-dimensional surface in sequence to illustrate changes in full color of the same basic model.

While each of these displays functions with a certain degree of efficiency, none addresses or solves the problems identified herein relating to the limitations placed on the size and number of images, to the impractical increase in structural size required to increase the size and/or number of images, to the parallax effect, and to the limitations on the number of images due to the reduction of image intensity as light passes through additional coated reflecting surfaces as does the improved multiplanar display system of the present invention as is hereinafter more fully described.

DISCLOSURE OF THE INVENTION

An object of the present invention is to provide an improved multiplanar image display system capable of displaying a relatively large number of images in a relatively large number of planes.

Another object is to provide an improved multiplanar image display system capable of producing images in planes that are relatively closely spaced to produce minimal parallax.

Still another object is to provide an improved multiplanar image display system having display units that are adjustably mounted.

Yet another object is to provide an improved multiplanar image display system that uses plain glass or plastic as reflecting elements, rather than partially silvered glass, to minimize light lost passing therethrough and thus increase the practical number of image planes.

Another object is to provide an improved multiplanar image display system wherein the display units can be controlled individually or together.

A feature of the present invention is that it can be constructed in modular form, thus facilitating its fabrication, its transport, its expansion and its modification.

An advantage of the present invention is that it provides an improved multiplanar image display system requiring a minimum of structural depth for use in advertising and promotional applications.

Another advantage of the present invention is that it facilitates the consolidation of a number of display units, for example, those scanned by security personnel, television switching directors, aircraft controllers, and stock analysts, by providing means for disposing multiple images in an overlapping manner along a viewing axis.

In realizing the aforementioned and other objects, features and advantages, the multiplanar image display system of the present invention includes a support frame defining an image chamber and at least one mounting section displaced therefrom. The image chamber has a mounting end and a viewing end.

At least one primary display unit (DU) is disposed within the image chamber proximate the mounting end thereof. The at least one primary display unit has an image plane that centrally defines a viewing axis extending substantially horizontally therefrom. The image plane is oriented to expose a primary image displayed thereon to view from the viewing end of the image chamber and generally along the viewing axis.

At least one transparent panel is disposed between the image plane of the at least one primary display unit and the viewing end of the image chamber and is acutely angled to the viewing axis.

At least one secondary display unit is disposed within the at least one mounting section. The at least one secondary display unit has an image plane the general plane of which is acutely angled to the viewing axis to expose a secondary image displayed on the image plane, upon being reflected by the at least one transparent panel, to view from the viewing end of the image chamber. The primary and secondary images appear in overlapping relationship to each other when viewed generally along the viewing axis.

By using a plurality of display units, the multiplanar image display system of the present invention solves the problems of limited image size and number that attend an image display system having only one display unit.

Having one or more display units disposed within the image chamber and one or more display units disposed at acute angles to the viewing axis in one or more mounting sections displaced from the image chamber solves the problem that would attend an image display system having only one display unit if an attempt was made to use the latter to increase the number of images created within a practically sized structure. The arrangement of the display units in the multiplanar image display system of the present invention reduces, at least in the direction of the viewing axis, the minimum size of the structure within which a multiplanar image display system can be disposed.

Having the plurality of display units disposed as just described also allows the images to be closer to each other than does an image display system having only one display unit. Since the parallax effect created in a multiplanar image display system is proportional to the distances between images, having closely spaced images reduces the parallax effect. This is particularly important when an appreciable number of viewers are likely to be moving past the system while observing the images.

Using transparent panels, formed from glass or plastic, the surfaces of which are not reflectively coated solves the problem of light losses associated with coated reflective surfaces when light from images passes through subsequent panels.

The objects, features and advantages of the present invention are readily apparent from the following detailed description of the best mode for carrying out the invention when taken in connection with accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
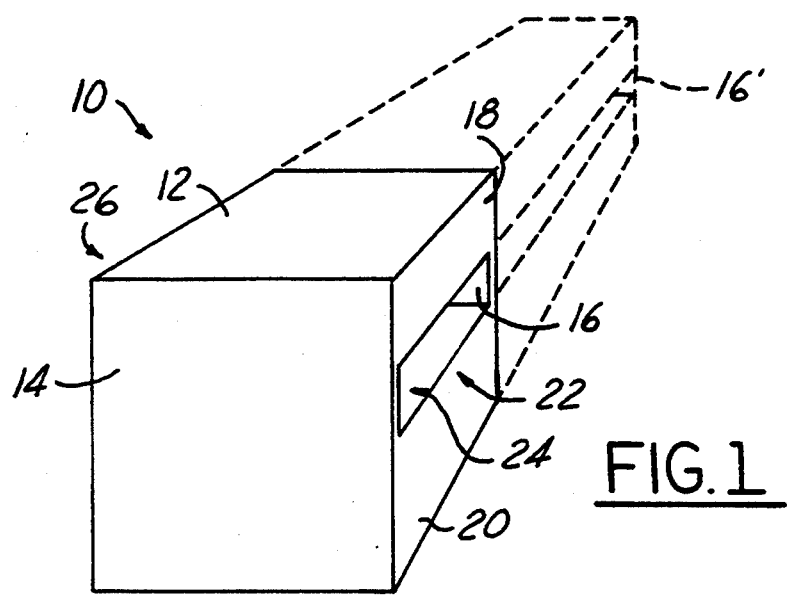
FIG. 1 is a perspective view of the multiplanar image display system of the present invention.
Figure 2:
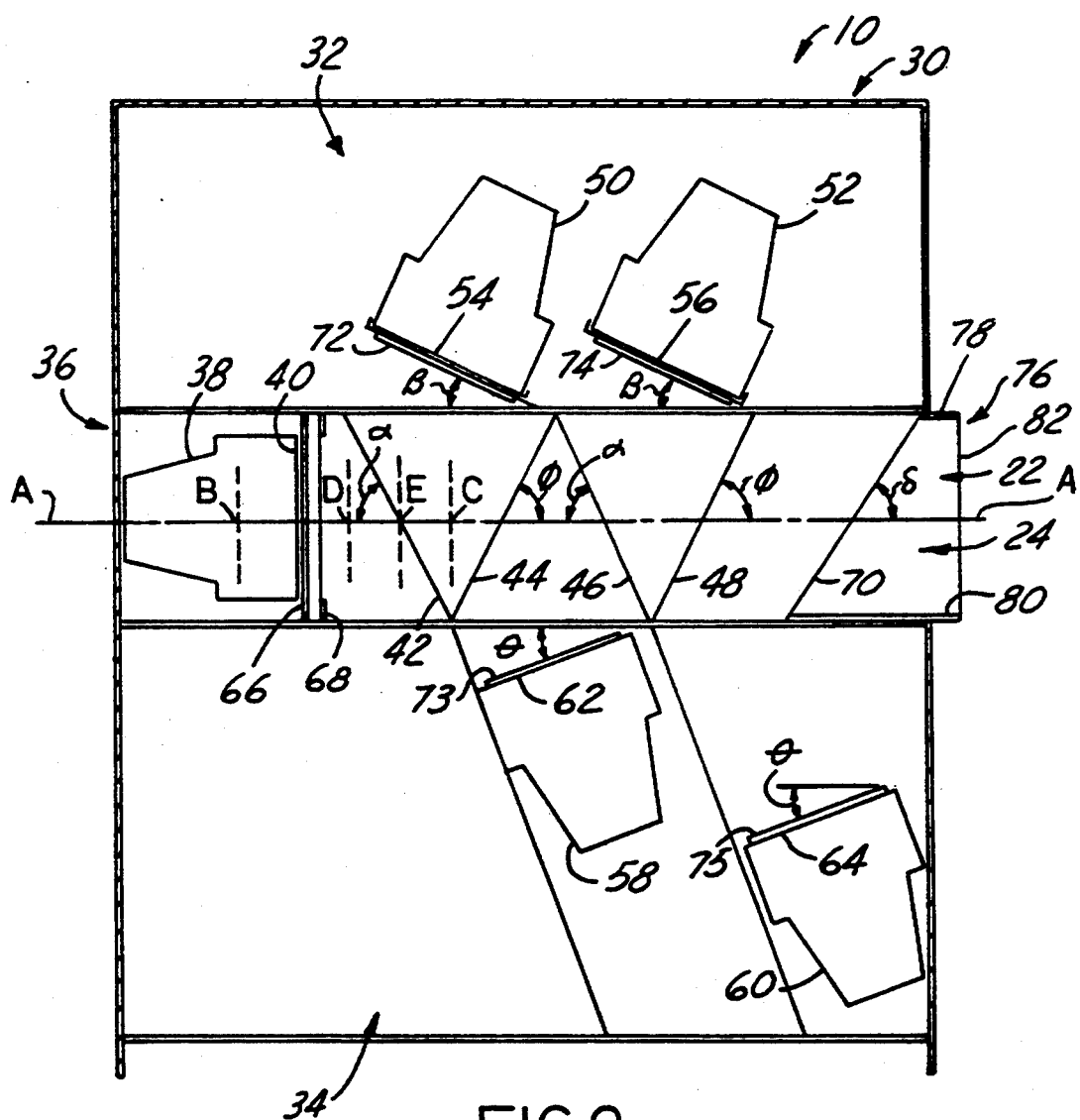
FIG. 2 is an uncovered side view, partially in section, of a typical bank of the multiplanar image display system of FIG. 1.

A multiplanar image display system, generally indicated by reference numeral 10, is shown in FIGS. 1 and 2 of the drawings. FIG. 1 is a perspective view of the multiplanar image display system 10 shown with covers in place. Included are a top cover 12, a left side cover 14, a right side cover 16, an upper front cover 18 and a lower front cover 20. A rear cover is not shown, but its position at the rear of the multiplanar image display system is generally indicated by reference numeral 26.

Also shown in FIG. 1 is the viewing end, generally indicated by reference numeral 22, of an image chamber, generally indicated by reference numeral 24. It should be noted that, although each of the covers are shown as being formed of one continuous piece of material, the covers could, of course, be formed of any number of pieces as dictated by manufacturing, shipping and assembly considerations.

As indicated by dashed lines of FIG. 1, the multiplanar image display system can be extended to accommodate an additional number of display units (DU's). In the extended version, the image chamber 24 would extend uninterruptedly; and the side cover 16 would be disposed as indicated by reference numeral 16'. It should be understood that, in addition to being enclosed in a linear housing as shown, the present invention could also be enclosed, for example, in S-shaped, U-shaped, polygonal and circular housings (not shown).

FIG. 2 of the drawings is an uncovered side view of a typical bank of the multiplanar image display system 10. A support frame, generally indicated by reference numeral 30, defines an upper mounting section, generally indicated by reference numeral 32, and a lower mounting section, generally indicated by reference numeral 34.

The support frame 30 also defines an image chamber, generally indicated by reference numeral 24, disposed between the upper mounting section 32 and the lower mounting section 34. The image chamber 24 has a viewing end, generally indicated by reference numeral 22, located in a front portion thereof and a mounting end, generally indicated by reference numeral 36, located in a rear portion thereof.

A primary display unit 38 is adjustably mounted on the support frame 30 within the image chamber 24, proximate the mounting end 36 thereof, and has an image plane 40 facing the viewing end 22 of the image chamber 24. A viewing axis A—A is defined as extending substantially centrally from the image plane 40 and horizontally toward the viewing end 22 of the image chamber 24. The image plane 40 is oriented so that a primary image displayed thereon is exposed to view, generally along the viewing axis A—A, from the viewing end 22 of the image chamber 24.

A plurality of transparent panels are mounted on the support frame 30 between the image plane 40 of the primary display unit 38 and the viewing end 22 of the image chamber 24 and are acutely angled to the viewing axis A—A. A primary image displayed on the image plane 40 of the primary display unit 38 is transmitted generally along the viewing axis A—A through each of the plurality of transparent panels.

The plurality of transparent panels include a first transparent panel 42, which is angled toward the image plane 40 to form an angle $\alpha$ (alpha) with respect to the viewing axis A—A. A second transparent panel 44 is mounted to the distal side of the first transparent panel 42 from the image plane 40 and is angled away therefrom to form an angle $\phi$ (phi) with respect to the viewing axis A—A.

A third transparent panel 46 is mounted to the distal side of the second transparent panel 44 from the image plane 40 and is parallel to the first transparent panel 42. A fourth transparent panel 48 is mounted to the distal side of the third transparent panel 46 from the image plane 40 and is parallel to the second transparent panel 44. The transparent panels 42, 44, 46 and 48 are formed of transparent material such as plain glass or plastic and are not reflectively coated with silver or the like.

The primary image displayed on the image plane 40 of the primary display unit 38 is transmitted generally along the viewing axis A—A through the first, second, third and fourth transparent panels 42, 44, 46 and 48 respectively for viewing at the viewing end 22 of the image chamber 24.

A plurality of secondary display units are also adjustably mounted on the support frame 30 within the upper mounting section 32 and include first and second upper secondary display units 50 and 52 respectively. As shown by FIG. 2, the first and second upper secondary display units 50 and 52 are laterally adjustable; but they could, of course, be readily made adjustable in the direction of their associated transparent panels 42 and 46 respectively as well.

The first and second upper secondary display units 50 and 52 respectively have first and second upper image planes 54 and 56 generally facing away from the viewing end 22 of the image chamber 24. The general planes of the first and second upper image planes 54 and 56 are angled toward the image plane 40 of the primary display unit 38 to form angles $\beta$ (beta) with respect to the viewing axis A—A.

A secondary image displayed on the first upper image plane 54 of the first upper secondary display unit 50 is reflected by the first transparent panel 42 and transmitted generally along the viewing axis A—A through the second, third and fourth transparent panels 44, 46 and 48 respectively for viewing at the viewing end 22 of the image chamber 24. A secondary image displayed on the second upper image plane 56 of the second upper secondary display unit 50 is reflected by the third transparent panel 46 and transmitted generally along the viewing axis A—A through the fourth transparent panel 48 for viewing at the viewing end 22 of the image chamber 24.

The plurality of secondary display units also include first and second lower secondary display units 58 and 60 adjustably mounted on the support frame 30 within the lower mounting section 34. As shown by FIG. 2, the first and second lower secondary display units 58 and 60 are laterally adjustable and are also adjustable in the direction of their associated transparent panels 44 and 48 respectively.

The first and second lower secondary display units 58 and 60 respectively have first and second lower image planes 62 and 64 generally facing away from the viewing end 22 of the image chamber 24. The general planes of the first and second lower image planes 62 and 64 are angled away from the image plane 40 of the primary display unit 38 to form angles $\theta$ (theta) with respect to the viewing axis A—A.

A secondary image displayed on the first lower image plane 62 of the first lower secondary display unit 58 is reflected by the second transparent panel 44 and transmitted generally along the viewing axis A—A through the third and fourth transparent panels 46 and 48 respectively for viewing at the viewing end 22 of the image chamber 24. A secondary image displayed on the second lower image plane 60 of the second lower secondary display unit 64 is reflected by the fourth transparent panel 48 and transmitted generally along the viewing axis A—A for viewing at the viewing end 22 of the image chamber 24.

A primary image, of course, appears to a viewer to be at a primary image plane 40 of the primary display unit 38. Secondary images, however, appear to a viewer to be disposed at points along the viewing axis A—A. A secondary image transmitted from the first upper image plane 54 of the first upper secondary display unit 50, for example, appears to be disposed at point B, which is at a distance behind the first transparent panel 42 equal to the distance between the first upper image plane 54 and the first transparent panel 42.

A secondary image transmitted from the second upper image plane 56 of the first upper secondary display unit 52 appears to be disposed at point C, which is at a distance behind the third transparent panel 46 equal to the distance between the second upper image plane 56 and the third transparent panel 46. In a like manner, secondary images transmitted from the first and second lower image planes 62 and 64 of respective first and second lower secondary display units 58 and 60 appear to be disposed at respective points D and E.

The primary and secondary images appear in overlapping relationship to each other when viewed generally along the viewing axis A—A from the viewing end 22 of the image chamber 24. With the multiplanar image display system 10 of the present invention, the relative angular and linear dispositions of the display units 38, 50, 52, 58 and 60 and the transparent panels 42, 44, 46 and 48 can be arranged so that the images appearing at points B, C, D and E along the viewing axis A—A are within a few inches of each other.

An image separation range of 3 to 5 inches is readily attainable and provides desirable multiplanar and parallax effects. The image separation is adjustable by varying the distances of the secondary display units 50, 52, 58 and 60 from the viewing axis A—A. The number of image planes can varied by increasing or decreasing the number of secondary display units.

The angles $\alpha$ are related to the angles $\beta$ in the following manner.

$$\alpha = \frac{90° + \beta}{2} \text{ and } \beta = 2\alpha - 90°$$

The angles $\phi$ are related to the angles $\theta$ in the following manner.

$$\phi = \frac{90° + \theta}{2} \text{ and } \theta = 2\phi - 90°$$

The angles $\alpha$ are within a range between 55 and 65 degrees and are preferably 60 degrees. As illustrated by FIG. 2, the angles $\alpha$ (alpha) and the angles $\phi$ (phi) are both equal to 60 degrees. Angles $\beta$ (beta) and angles $\theta$ (theta) are both equal to 30 degrees.

For most effective operation, a dark background is established in each display unit against which images displayed thereby are contrasted. A nonglare transparent panel 66 is disposed to cover the image plane 40 of the primary display unit 38 to minimize reflections of any light reaching the image plane 40. Similar nonglare transparent panels 72 and 74 are disposed to cover the respective image planes 54 and 56 of the first and second upper secondary display units 50 and 52 to minimize light reflections. While not essential for most applications similar nonglare transparent panels 73 and 75 are shown covering the image planes 62 and 64 of the lower secondary display units 58 and 60 respectively.

A baffle 68 is also disposed between the image plane 40 of the primary display unit 38 and the viewing end 22 of the image chamber 24 and proximate the former. The baffle 68 defines therein an aperture having a size equal to that of an image to be exposed on the image plane 40, the areas of the baffle 68 bordering the aperture being coated with a nonreflecting material such as flat black paint to minimize light reflection. Similar baffles (not shown) could, of course, be disposed before the image planes 54, 56, 62 and 64 of any or all of the secondary display units 50, 52, 58 and 60 respectively.

A shadow box, generally indicated by reference numeral 76, is disposed at the viewing end 22 of the image chamber 24. The shadow box 76 respectively includes upper, lower and side panels 78, 80 and 82 that extend from the image chamber 24 to minimize the amount of entering light. Inside surfaces of the shadow box 76 are coated with a nonreflecting material such as flat black paint to minimize the entry of ambient light into the image chamber 24. All exposed surfaces within the multiplanar image display system are also coated with a nonreflecting material such as flat black paint to minimize light reflection.

A transparent dust panel 70 is also disposed proximate the viewing end of the image chamber 24 to exclude dust therefrom. The transparent dust panel 70 is angled toward the viewing end 22 of the image chamber 24 to reflect entering light downwardly toward the nonreflectively coated inner surface of the lower panel 80 of the shadow box 76.

Figure 3:
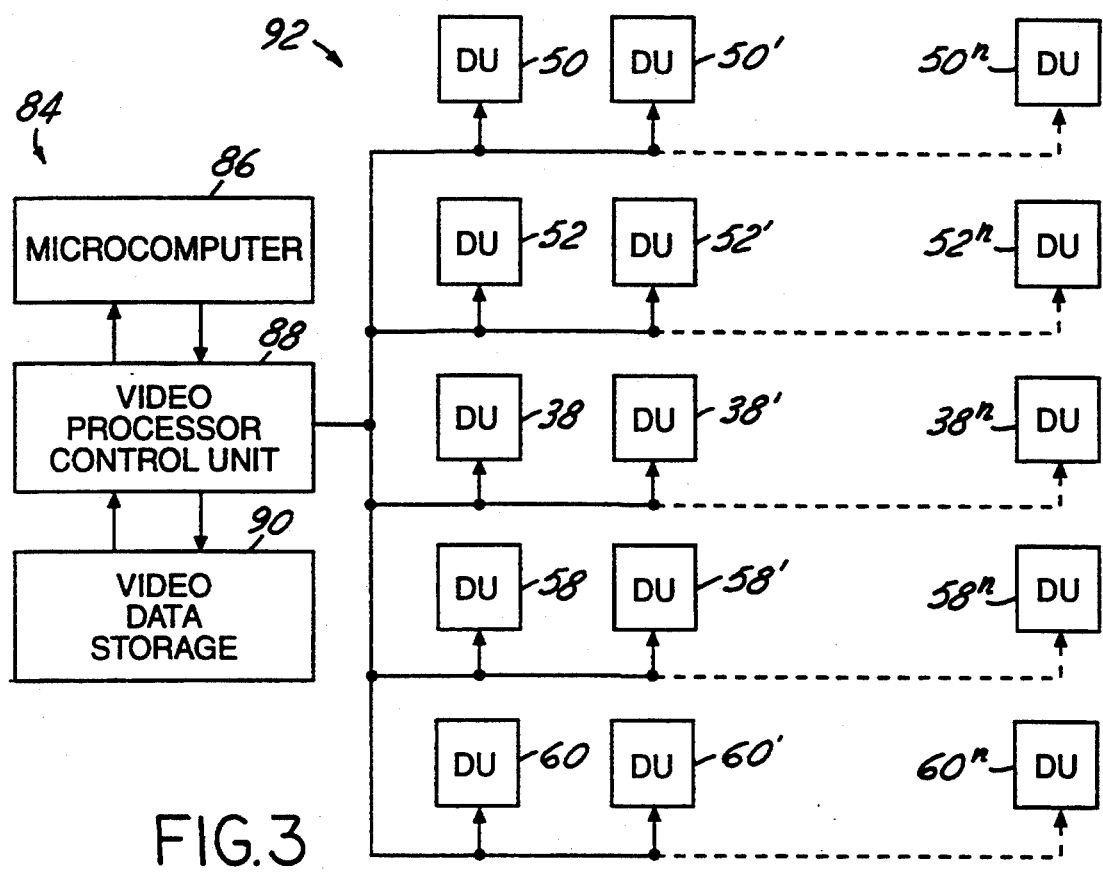
FIG. 3 is a schematic diagram of a control system used to control video display units of a first preferred embodiment of the multiplanar image display system.

In a first preferred embodiment of the multiplanar image display system 10 of the present invention, the primary and secondary display units 38, 50, 52, 58 and 60 include video display units, the latter using cathode ray tubes and functionally equivalent devices. FIG. 3 of the drawings schematically shows a representative video control system, generally indicated by reference numeral 84, used to control banks of the display units of the multiplanar image display system.

The video control system 84 includes a microcomputer 86, a video processor control unit 88 and a video data storage system 90. The video data storage system 90 stores data associated with video images to be displayed on the various video display units, here collectively indicated by reference numeral 92. The video image data may be stored on such media as video tapes and laser disks.

The video processor control unit 88, under programmed direction of the microcomputer 86, retrieves video image data from the video data storage system 90 and communicates it to specific video display units The images displayed on the video display units 92 can thus be individually complete pictures, elements of one large picture, or any combination thereof.

In a second preferred embodiment of the multiplanar image display system 10 of the present invention, the primary and secondary display units 38, 50, 52, 58 and 60 include transparency display units. The dimensions of the image areas of the latter can be altered as dictated by application. For example, a short, wide image of a city skyline or a large overall image of a reef might be needed as backgrounds for an urban or an undersea setting respectively.

Figure 4:
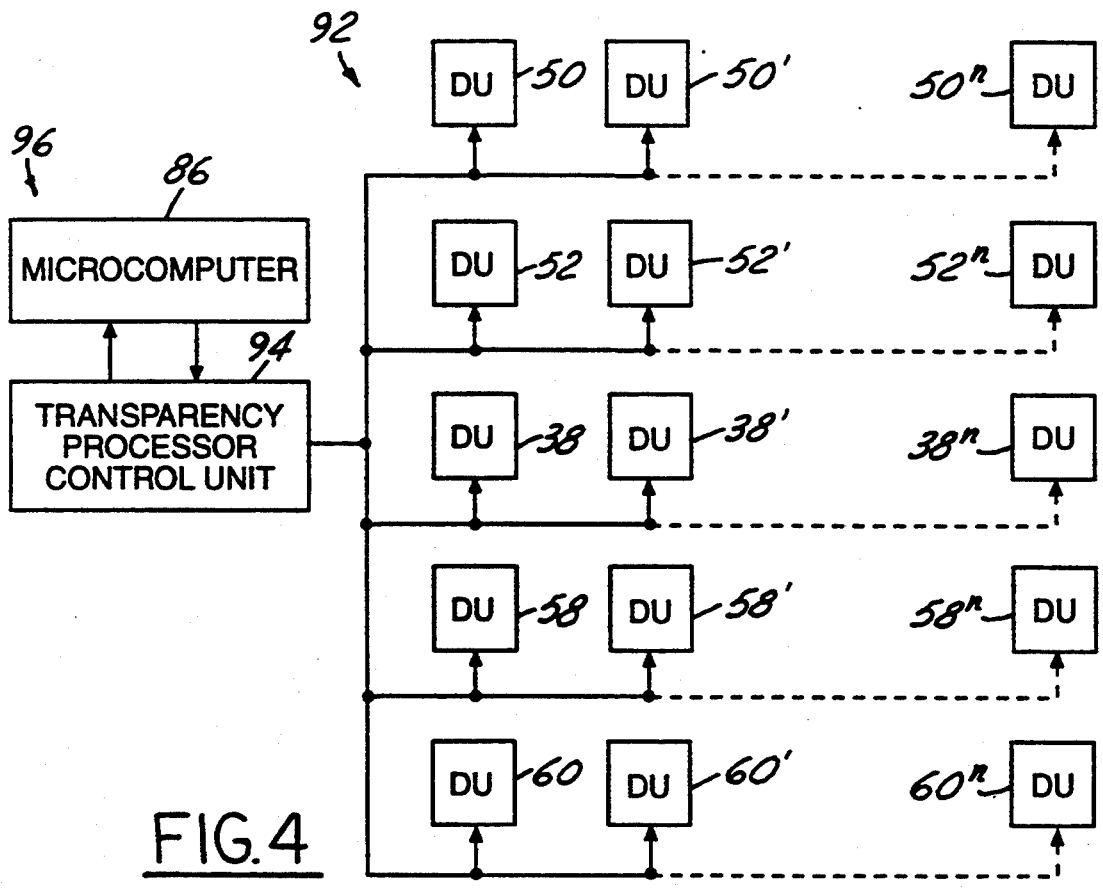
FIG. 4 is a schematic diagram of a control system used to control transparency display units of a second preferred embodiment of the multiplanar image display system.

FIG. 4 of the drawings schematically shows a representative transparency control system, generally indicated by reference numeral 96, used to control banks of the display units of the multiplanar image display system. The transparency control system 96 includes a microcomputer 86 and a transparency processor control unit 94. The transparency processor control unit 94, under programmed direction of the microcomputer 86, controls the operation of the transparency display units 92, turning them on or off individually or together.

It should be understood that, although the first and second preferred embodiments disclosed and claimed respectively include video display units and transparency display units, it would be obvious to one having ordinary skill in the art to assemble a multiplanar image display system including a combination of both video and transparency display units.

While the best mode for carrying out the invention has been described in detail, those familiar with the art to which this invention relates will recognize various alternative designs and embodiments for practicing the invention as defined by the following claims.

What is claimed is:

1. A multiplanar image display system, comprising:
   a support frame defining an image chamber and at least one mounting section displaced therefrom, the image chamber having a mounting end and a viewing end;
   at least one primary display unit disposed within the image chamber proximate the mounting end thereof and having a primary image plane defining a viewing axis extending substantially horizontally therefrom toward the viewing end of the image chamber, the primary image plane being oriented to expose a primary image displayed therein to view from the viewing end of the image chamber and generally along the viewing axis;
   at least one transparent panel disposed between the primary image plane of the at least one primary display unit and the viewing end of the image chamber and acutely angled to the viewing axis; and
   at least one secondary display unit disposed within the at least one mounting section, the at least one secondary display unit having a secondary image plane acutely angled to the viewing axis to expose a secondary image displayed in the secondary image plane to view from the viewing end of the image chamber, as reflected by the at least one transparent panel, the primary and secondary images appearing in overlapping relationship to each other when viewed generally along the viewing axis from the viewing end of the image chamber.

2. The multiplanar image display system defined by claim 1, wherein the at least one mounting section includes:
   an upper mounting section vertically displaced above the image chamber; and
   a lower mounting section vertically displaced below the image chamber.

3. The multiplanar image display system defined by claim 2, wherein the at least one transparent panel includes a plurality of transparent panels disposed at acute angles to, and spaced along, the viewing axis within the image chamber.

4. The multiplanar image display system defined by claim 3, wherein the at least one secondary display unit includes:
   at least one upper secondary display unit disposed within the upper mounting section; and
   at least one lower secondary display unit disposed within the lower mounting section.

5. The multiplanar image display system defined by claim 4, wherein the plurality of transparent panels includes:
   a first transparent panel angled toward the primary image plane to form an acute angle with respect to the viewing axis to reflect a secondary image from the secondary image plane of the at least one upper secondary display unit along the viewing axis to the viewing end of the image chamber; and
   a second transparent panel disposed on a distal side of the first transparent panel from the primary image plane and angled away therefrom to form an acute angle with respect to the viewing axis to reflect a secondary image from the secondary image plane of the at least one lower secondary display unit along the viewing axis to the viewing end of the image chamber.

6. The multiplanar image display system defined by claim 5, wherein the primary and secondary display units include video display units.

7. The multiplanar image display system defined by claim 6, further including video control means for controlling video image data input to the video display units.

8. The multiplanar video display system defined by claim 7, wherein the video control means includes:
   a microcomputer;
   a video data storage system for storing video image data used to create video images displayed on the video display units; and
   a video processor control unit for retrieving, under control of the microcomputer, video image data from the video data storage system and communicating it to specific video display units.

9. The multiplanar image display system defined by claim 5, wherein the primary and secondary display units include transparency display units.

10. The multiplanar image display system defined by claim 9, further including transparency control means for controlling the transparency display units.

11. The multiplanar image display system defined by claim 10, wherein the transparency control means includes:
    a microcomputer;
    a transparency processor control unit for turning on and off, under control of the microcomputer, specific transparency display units.

12. The multiplanar image display system defined by claim 5, wherein:
    the acute angle formed between the first transparent panel and the viewing axis is between 55 degrees and 65 degrees; and
    the acute angle formed between the second transparent panel and the viewing axis is between 55 degrees and 65 degrees.

13. The multiplanar image display system defined by claim 12, wherein the acute angle formed between the first transparent panel and the viewing axis and the acute angle formed between the second transparent panel and the viewing axis are equal.

14. The multiplanar image display system defined by claim 13, wherein:
    the acute angle formed between the secondary image plane of the at least one upper secondary display unit and the viewing axis is 90 degrees less than twice the acute angle formed between the first transparent panel and the viewing axis; and
    the acute angle formed between the secondary image plane of the at least one lower secondary display unit and the viewing axis is 90 degrees less than twice the acute angle formed between the second transparent panel and the viewing axis.

15. The multiplanar image display system defined by claim 3, wherein the plurality of transparent panels are formed of nonreflectively coated transparent material.

16. The multiplanar image display system defined by claim 1, further including a transparent panel made of nonglare material disposed immediately before the primary image plane of the at least one primary display unit to minimize light reflections reaching the primary image plane.

17. The multiplanar image display system defined by claim 4, further including a transparent panel made of nonglare material disposed immediately before the secondary image plane of the at least one upper secondary display unit to minimize light reflections reaching the secondary image plane.

18. The multiplanar image display system defined by claim 4, further including a transparent panel made of nonglare material disposed immediately before the secondary image plane of the at least one lower secondary display unit to minimize light reflections reaching the secondary image plane.

19. The multiplanar image display system defined by claim 1, wherein the at least one primary display unit and the at least one secondary display unit are laterally adjustable with respect to the viewing axis.

20. The multiplanar image display system defined by claim 5, wherein the at least one secondary display unit is adjustable in the direction of the second transparent panel.

21. A method of creating a multiplanar image display, the method comprising:
    disposing at least one primary display unit at a first predetermined distance from at least one transparent panel;
    disposing a secondary display unit at a second predetermined distance from the at least one transparent panel;
    exposing a first image from the at least one primary display unit, through the at least one transparent panel, to a viewing position;
    exposing a second image from the at least one secondary display unit, reflected by the at least one transparent panel, to the viewing position, thereby causing the first and second images to overlap to create an illusion of a three-dimensional display.

22. The method as defined by claim 21, further including controlling the at least one primary and the at least one secondary display units to create independent images during a first predetermined period and to create supplementary images during a second predetermined period.

23. The method as defined by claim 21, further including establishing a dark background against which to contrast images being displayed.

* * * * *